(12) United States Patent
Saghir et al.

(10) Patent No.: US 12,231,470 B2
(45) Date of Patent: Feb. 18, 2025

(54) NETWORK DISCOVERY IN A LAWFUL INTERCEPT SYSTEM

(71) Applicant: VERIZON PATENT AND LICENSING INC., Basking Ridge, NJ (US)

(72) Inventors: Amir Saghir, Frisco, TX (US); Jerry Steben, Fort Worth, TX (US); Jayshree A. Bharatia, Plano, TX (US); William W. Wong, Madison, NJ (US); Maqbool Chauhan, Keller, TX (US); Raymond WaiMan So, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 421 days.

(21) Appl. No.: 17/675,269

(22) Filed: Feb. 18, 2022

(65) Prior Publication Data

US 2023/0269278 A1    Aug. 24, 2023

(51) Int. Cl.
*H04L 9/40* (2022.01)
*H04L 67/141* (2022.01)
*H04L 67/146* (2022.01)

(52) U.S. Cl.
CPC ............ *H04L 63/306* (2013.01); *H04L 63/20* (2013.01); *H04L 67/141* (2013.01); *H04L 67/146* (2013.01)

(58) Field of Classification Search
CPC ....... H04L 63/20; H04L 63/30; H04L 63/302; H04L 63/304; H04L 63/306; H04L 67/141; H04L 678/146
See application file for complete search history.

(56) References Cited

U.S. PATENT DOCUMENTS

| | | | |
|---|---|---|---|
| 10,812,629 B2* | 10/2020 | Park | H04W 8/08 |
| 11,064,422 B2* | 7/2021 | Cakulev | H04L 12/1407 |
| 11,070,627 B2* | 7/2021 | Talebi Fard | H04L 67/147 |
| 11,533,649 B2* | 12/2022 | Sundaram | H04W 8/02 |
| 11,849,009 B2* | 12/2023 | Park | H04W 72/0453 |
| 2019/0005109 A1* | 1/2019 | Singhal | H04L 43/12 |

* cited by examiner

*Primary Examiner* — Hosuk Song

(57) ABSTRACT

Disclosure are techniques for allocating aggregation devices in a lawful intercept system. In an embodiment, a method includes maintaining a list of point of interception aggregation (PAG) functions in a network function repository function (NRF) of a cellular network upon instantiation of the PAG functions; receiving a lawful intercept (LI) request; querying the NRF to determine a respective PAG function; and associating a point of interception (POI) function with the respective PAG function.

20 Claims, 6 Drawing Sheets

NETWORK DISCOVERY IN A LAWFUL INTERCEPT SYSTEM

BACKGROUND INFORMATION

Cellular networks provide facilities for supporting lawful intercept (LI) requests from law enforcement agency organizations. In response to a valid warrant or request, such cellular networks can forward data, voice, and other communications to a law enforcement agency associated with the warrant or request.

DETAILED DESCRIPTION OF EXAMPLE EMBODIMENTS

Figure 1:
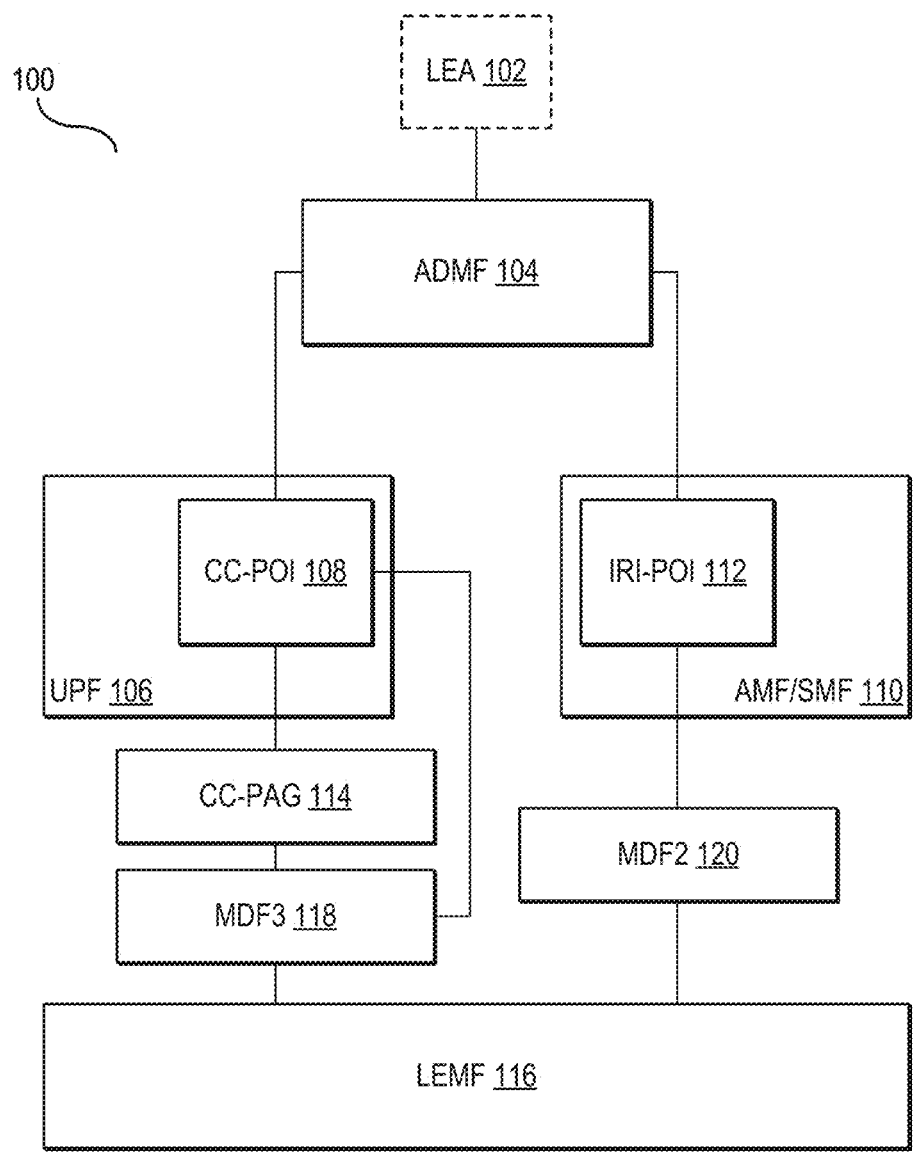
FIG. 1 is a block diagram illustrating a lawful intercept system according to some of the example embodiments.

The example embodiments are directed to network discovery and, in particular, to techniques for discovering network elements in an LI system. An LI system includes various elements to support lawful interception by a law enforcement agency (LEA), including lawful intercept-specific devices or network functions. One such device is a point of interception (POI) network function that collects data from a UE and forwards the data to a medication and delivery function (MDF) (e.g., MDF3), which ultimately delivers the intercepted data to law enforcement. In some embodiments, the MDF facilitates communications between a POI device or network function and a law enforcement monitoring facility (LEMF). Although the description uses network functions when describing the embodiments, the embodiments can implement such network functions using virtual or physical devices in some embodiments.

In general, a provisioning function such as a lawful interception provisioning function (LIPF) provisions a POI and associates the POI with one or more UEs. However, maintaining network connections between each POI and corresponding MDFs can overutilize network resources. Thus, some LI systems include aggregation devices. One example of an aggregation device is a POI aggregator (PAG or CC-PAG). A PAG is a network function located between one or more POIs and the MDF. In an embodiment, the PAG aggregates intercepted communications from the multiple UE connected to the POIs. The PAG then delivers the aggregated communications to the LEMF via the MDF.

In the embodiments, the PAG comprises a provisioned network function. The cellular network can provision a PAG in various geographic locations within a cellular network. Since the location of a PAG can influence network latency, the example embodiments provide systems, methods, devices, and computer-readable media for dynamically selecting or provisioning a PAG in response to an LI request. This dynamic selection or provisioning can ensure that the cellular network uses an optimal PAG during an LI.

In some aspects, the techniques described herein relate to a method including maintaining a list of point of interception aggregation (PAG) functions in a network function repository function (NRF) of a cellular network upon instantiation of the PAG functions. The method then receives a lawful intercept (LI) request and queries the NRF to determine a respective PAG function. Finally, the method can include associating a point of interception (POI) function with the respective PAG function.

In some aspects, maintaining a list of PAG functions can include detecting an instantiation of a given PAG function and transmitting a notification to the NRF in response to the instantiation. In some aspects, transmitting the notification to the NRF includes transmitting a profile describing the given PAG function that includes one or more of a geographic location, one or more associated user plane function (UPF) identifiers, one or more UPF location identifiers, a service type, an Internet Protocol (IP) address, one or more slice identifiers, or a traffic load type. In some aspects, querying the NRF to determine the respective PAG function includes issuing a query to the NRF by a user plane function (UPF). In some aspects, the UPF can receive an identification of the respective PAG function from the NRF in response to the query and transmit intercepted data to the respective PAG function. In some aspects, querying the NRF to determine the respective PAG function includes issuing a query to the NRF by a session management function (SMF). In some aspects, the SMF receives an identification of the respective PAG function from the NRF in response to the query and transmits the identification of the respective PAG function to a UPF prior to the UPF establishing a data session.

In some aspects, the techniques described herein relate to a non-transitory computer-readable storage medium for tangibly storing computer program instructions capable of being executed by a computer processor that define the steps of maintaining a list of point of interception aggregation (PAG) functions in a network function repository function (NRF) of a cellular network upon instantiation of the PAG functions; receiving a lawful intercept (LI) request; querying the NRF to determine a respective PAG function; and associating a point of interception (POI) function with the respective PAG function.

In some aspects, maintaining a list of PAG functions includes: detecting an instantiation of a given PAG function; and transmitting a notification to the NRF in response to the instantiation. In some aspects, transmitting the notification to the NRF includes transmitting a profile describing the given PAG function that includes one or more of a geographic location, one or more associated user plane function (UPF) identifiers, one or more UPF location identifiers, a service type, an Internet Protocol (IP) address, one or more slice identifiers, or a traffic load type. In some aspects, querying the NRF to determine the respective PAG function includes issuing a query to the NRF by a user plane function (UPF). In some aspects, the UPF receives an identification of the respective PAG function from the NRF in response to the query and transmits intercepted data to the respective PAG function. In some aspects, querying the NRF to determine the respective PAG function includes issuing a query to the NRF by a session management function (SMF). In some aspects, the SMF receives an identification of the respective PAG function from the NRF in response to the query and transmits the identification of the respective PAG function to a UPF prior to the UPF establishing a data session.

In some aspects, the techniques described herein relate to a device including a processor configured to receive a lawful intercept (LI) request. In response, the processor is configured to query a network function repository function (NRF) of a cellular network to determine a respective PAG function, the NRF configured to maintain a list of point of interception aggregation (PAG) functions in the cellular network upon instantiation of the PAG functions. In some embodiments, the processor is further configured to associate a point of interception (POI) function with the respective PAG function.

In some aspects, receiving the LI request includes receiving one of a message from an administrative function (ADMF) or a message from a session management function (SMF). In some aspects, querying the NRF to determine the respective PAG function includes issuing a query to the NRF in response to receiving a message from an SMF. In some aspects, the processor is further configured to receive an identification of the respective PAG function from the NRF in response to the query, and transmit intercepted data to the respective PAG function. In some aspects, querying the NRF to determine the respective PAG function includes issuing a query to the NRF in response to receiving a message from an ADMF. In some aspects, the processor is further configured to receive an identification of the respective PAG function from the NRF in response to the query and transmit the identification of the respective PAG function to a UPF prior to the UPF establishing a data session.

FIG. 1 is a block diagram illustrating a lawful intercept system according to some of the example embodiments.

In an embodiment, system 100 includes an LEA 102. In an embodiment, the LEA 102 can include a law enforcement agency and can include a plurality of networked systems for communicating with an administrative function (ADMF 104). In general, the LEA can be an entity responsible for submitting the warrant to a cellular network for lawful intercept.

In an embodiment, the ADMF 104 can comprise an administrative function of a cellular network. In an embodiment, ADMF 104 provides the administrative and management functions for the LI capability. In an embodiment, this can include the overall responsibility for the provisioning/ activating, modifying, and de-activating/de-provisioning the POIs, triggering functions (TF), and MDFs. In an embodiment, the ADMF 104 can include a Lawful Interception Control Function (LICF) that receives warrant requests from LEA 102 and controls the management of the end-to-end life cycle of a warrant. In an embodiment, the ADMF 104 can also include one or more Lawful Interception Provisioning Functions (LIPF) that can provision all the applicable POIs, TFs, and MDFs for a given warrant.

In an embodiment, system 100 can include at least one CC-POI 108 and IRI-POI 112. CC-POI 108 and IRI-POI 112 are described collectively, when useful, as POIs. The ADMF 104 can provision the CC-POI 108 and IRI-POI 112 in response to a warrant request. In brief, the CC-POI 108 and IRI-POI 112 both intercept data transmitted to or from a UE (not illustrated). In an embodiment, the CC-POI 108 can intercept data transmitted over a data plane (xCC) (via, for example, an MDF3 118 interface) while the IRI-POI 112 can intercept data transmitted over a control plane (xIRI) (via, for example, an MDF2 120 interface). As illustrated, a given POI can be embedded within a network function or separate from a network function with which it is associated. For example, in one implementation, the CC-POI 108 can be associated with, or embedded in, a user plane function (UPF 106) while IRI-POI 110 can be associated with, or embedded in, an access and mobility management function (AMF) and/or a session management function (SMF) (AMF/SMF 110).

In an embodiment, a PAG receives intercepted xCC data from CC-POI 108. For example, a CC-PAG 114 can receive xCC data from CC-POI 108 as well as multiple additional CC-POIs (not illustrated). In an embodiment, the CC-PAG 114 aggregates data from multiple CC-POIs and transmits the aggregated data to LEMF 116 over an interface (e.g., to an MDF3 118 via an L1_X3 interface, the MDF3 118 transmitting data to the LEMF 116 via an L1_HI3 interface). As illustrated, when a CC-PAG 114 is not deployed, intercepted data can be transmitted by the CC-POI 108 directly to MDF3 118.

In general, the CC-PAG 114 can comprise a network function that can be deployed in networks that need aggregation of xCC from a potentially large number of different CC-POIs towards the MDF3 118. In an embodiment, the CC-PAG may be deployed physically closer to the UPFs, to reduce the impact of latencies, packet drops, and buffering on UPFs for LI of highspeed user plane traffic. During provisioning, the ADMF 104 can provide an address of a corresponding MDF (e.g., MDF3 118) to the CC-PAG 114. In some embodiments, the CC-PAG 114 may forward the xCC data without modification to the MDF3 118. Although only a CC-PAG 114 is illustrated, similar aggregation devices may be implemented for control plane data (e.g., an aggregator situated between multiple IRI-POIs and the LEMF 116) and the disclosure is not limited to only CC-PAG devices or network functions.

While system 100 includes only a single instance of each element, a cellular network may (and often does) include multiple instances of such elements. For example, a given data center housing hardware operating the cellular network may replicate UPFs and CC-PAGs to provide higher throughput. Further, a cellular network can include multiple, geographically dispersed data centers. One example of this type of distribution is provided in FIG. 2.

Figure 2:
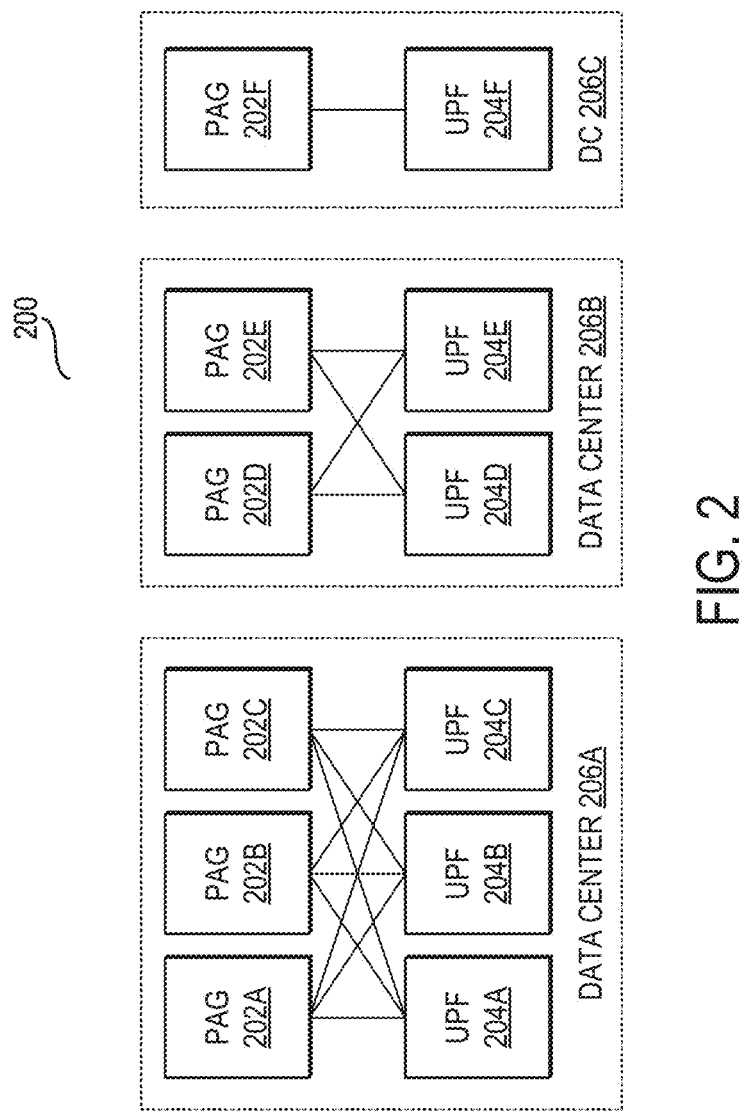
FIG. 2 is a block diagram illustrating a plurality of data centers in a cellular network according to some of the example embodiments.

FIG. 2 is a block diagram illustrating a plurality of data centers in a cellular network according to some of the example embodiments.

In the illustrated embodiment, a deployment 200 of a cellular network can include a plurality of data centers including data center 206A, data center 206B, and data center 206C. The specific number of data centers is not limiting and more or fewer data centers can be used to implement the cellular network. As discussed, the data centers can be geographically dispersed regionally, or globally, and no limit is placed on the specific location of a given data center.

In an embodiment, a given data center can include one or more UPF and PAG (e.g., CC-PAG) network functions. For example, data center 206A includes three UPF network functions (UPF 204A, UPF 204B, and UPF 204C), data center 206B includes two UPF network functions (UPF 204D, UPF 204E), and data center 206C includes one UPF network function (UPF 204F). Similarly, data center 206A includes three PAG network functions (PAG 202A, PAG 202B, and PAG 202C), data center 206B includes two PAG network functions (PAG 202D, PAG 202E), and data center 206C includes one PAG network function (PAG 202F). Certainly, a given data center can include additional network functions or devices not illustrated in FIG. 2 (and discussed, for example, in FIG. 1). Further, in some embodiments, a given data center may not include any PAG network functions and may only include UPF functions.

In an embodiment, UPF and PAG network functions can communicate with one another within a given data center. Further, in some embodiments, UPF and PAG network functions can communicate with other UPF and PAG network functions outside of a home data center (e.g., UPF 204A can communicate with PAG 202F, and vice-versa). As discussed in FIG. 1, a given UPF can also embed or be associated with a POI (e.g., CC-POI). As such, the POI embedded or associated with a given UPF in a data center transmits data to a PAG.

Given the high number of UPF and PAG network functions and interconnections between these devices, associating a given UPF with an optimal PAG is non-trivial. While the interface between a PAG and other network functions is well-defined, no consideration is given to the nature of deployment models with respect to a UPF and a PAG. Further, there are no standardized restrictions that a PAG and UPF must be the same logical network function or otherwise co-located. Thus, in a topologically diverse deployment that spans multiple data centers each of which containing a UPF such as deployment 200, it may be desirable for the PAG to be located closely with UPF, such that Internet Protocol (IP) transport delays can be minimized and security and integrity can be maintained. Since a PAG may be a separate entity from the UPF, and in virtual NF cases have independent lifecycle management requirements, it is desirable for the PAG to be dynamically located by either the SMF or the UPF upon the establishment of a session that is indicated for lawful intercept. Specifically, UPF and PAG functions are provisioned independent of one another and, generally, under different circumstances. For example, UPF functions are deployed based on network conditions and a cellular network will generally include numerous UPF instances. By contrast, PAG instances are generally smaller in number and instantiated at a much lower rate.

Figure 3:
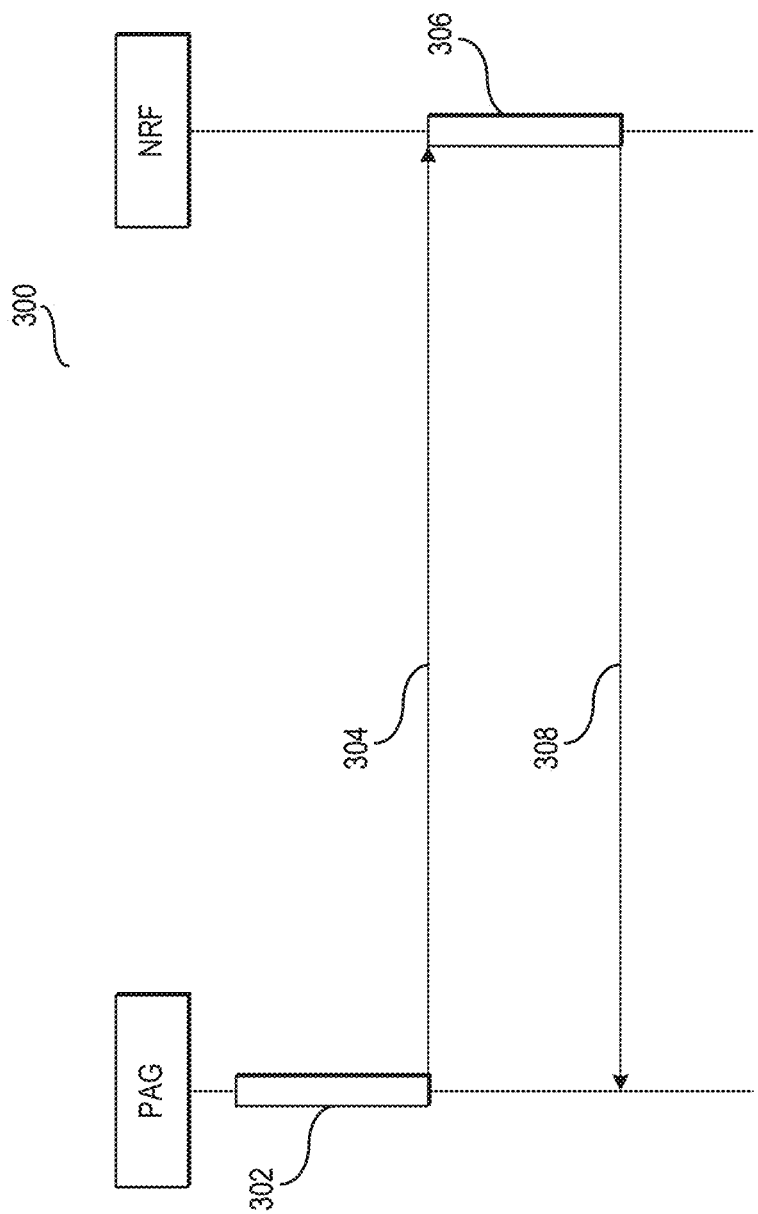
FIG. 3 is a call flow diagram illustrating a method for registering an aggregation device with a network discovery service according to some of the example embodiments.

FIG. 3 is a call flow diagram illustrating a method for registering an aggregation device (e.g., a CC-PAG) with a network discovery service (e.g., an NRF) according to some of the example embodiments.

In step 302, method 300 can include instantiating a PAG. In some embodiments, the PAG can comprise a CC-PAG. In some embodiments, the PAG can include a network function, and step 302 can include deploying the network function to a location in a cellular network (e.g., physical and/or virtual hardware). In some embodiments, step 302 can include a LIPF provisioning a CC-PAG instance and configuring the CC-PAG with an MDF3 address. In some embodiments, the LIPF can pre-provision the MDF3 address.

In step 304, method 300 can include transmitting a notification to the NRF in response to the instantiation in step 302.

In some embodiments, a given PAG instance can be configured to automatically transmit the notification to the NRF during instantiation. In some embodiments, step 304 can include transmitting a Hypertext Transfer Protocol (HTTP) request to the NRF. In some embodiments, step 304 can include transmitting an HTTP PUT request to the NRF. In some embodiments, the NRF exposes an endpoint that method 300 can call to invoke the network function register features of the NRF.

In some embodiments, step 304 can include issuing the notification and including an instance identification of the PAG instance. For example, step 304 can include issuing an HTTP PUT request to the URI/nnrf-nfm/v./nf-instances/:id, where ":id" represents the PAG identifier assigned during instantiation. In some embodiments, the PAG identifier uniquely identifies the PAG instance across the cellular network.

In some embodiments, step 304 can include transmitting a profile data structure as part of the notification. In some embodiments, the profile data structure can be transmitted as the body portion of an HTTP PUT request. In some embodiments, the profile data structure can include various fields describing the details of the PAG instance.

In some embodiments, the profile data structure can include a locality field. In some embodiments, the locality field can comprise an identifier of a geographic location in which the PAG is physically or logically located.

In some embodiments, the profile data structure can include a list of UPFs that the CC-PAG served by the CC-PAG. In some embodiments, this list of UPFs can comprise a list of co-located UPFs, the co-located UPFs located in the same data center as the PAG.

In some embodiments, the profile data structure can include a list of capabilities of the PAG. For example, the capabilities can include the ability to intercept one or more services such as data, voice, push-to-talk (PTT), Rich Communication Service (RCS) or short messaging service (SMS)/multimedia messaging service (MMS) data. In some embodiments, the capabilities can include the type of LI data capable of being aggregated by the PAG.

In some embodiments, the profile data structure can include a serving scope. In some embodiments, a serving scope can include a list of UPF location identifiers that the PAG can communicate with. In some embodiments, the serving scope can be geography-based and thus only UPF locations within a fixed distance may be included.

In some embodiments, the profile data structure can include a service type. In an embodiment, the service type can comprise a usage tier of the PAG. For example, a service type can be selected from an enterprise, consumer, Internet-of-Things, Multi-access Edge Computing (MEC), etc. type. In general, some PAGs can be dedicated to certain tiers of communications and this data can be included in the profile data structure.

In some embodiments, the profile data structure can include address information of the PAG. In some embodiments, this address information can identify an interface for receiving data from POIs. For example, the interface can comprise an LI_X3A interface. In some embodiments, the address information can comprise an IPv4 or IPv6 address. In some embodiments, the address information can comprise a fully qualified domain name (FQDN).

In some embodiments, the profile data structure can include a traffic load type. In some embodiments, the traffic load type can define the type, volume, or frequency of traffic allowed by the PAG instance. In some embodiments, the traffic load type can be manually specified or can be determined automatically.

In step 306, method 300 can include writing the received profile data and instance identifier to a persistent data store. In an embodiment, after receiving the profile data from the PAG, the NRF can store the profile data in a database or similar storage device for future use (described below).

In step 308, method 300 can include transmitting a response to the PAG indicating successful registration of the PAG. In some embodiments, the NRF can transmit an HTTP status code of 200 to indicate that the profile data was received and properly recorded. In some embodiments, the NRF can return an error code (e.g., HTTP 4XX for PAG errors or HTTP 5XX for NRF errors) to indicate an error occurred when attempting to register the PAG. In response, the PAG can attempt to re-register based on the type of error.

After step 308, the NRF can then maintain a list of PAG functions instantiated on the network. In some embodiments, method 300 can further include detecting that a PAG was uninstantiated. For example, prior to destroying the PAG network function, the PAG (or another device or network function) can issue an HTTP request with its instance identifier indicating it will be removed from service. In response, the NRF can query the database and remove any entries for the PAG that will be removed, thus keeping a database of PAG instances fresh and up to date. Further, in some embodiments, if a PAG is modified (e.g., the profile data changes), the PAG can be configured to issue a subsequent notification (identical to that described in step 304) to the NRF. In response, the NRF can update the currently stored profile data with the new profile data.

The above-described registration model is not implemented in current LI standards. Thus, in current systems, PAGs must be manually allocated to UPF instances, which results in significant inefficiencies given the number of UPF instances and frequent changes in UPF (and PAG) deployments. By registering PAG instances with an NRF, PAGs can be dynamically allocated to UPF instances, as will be discussed.

Figure 4:
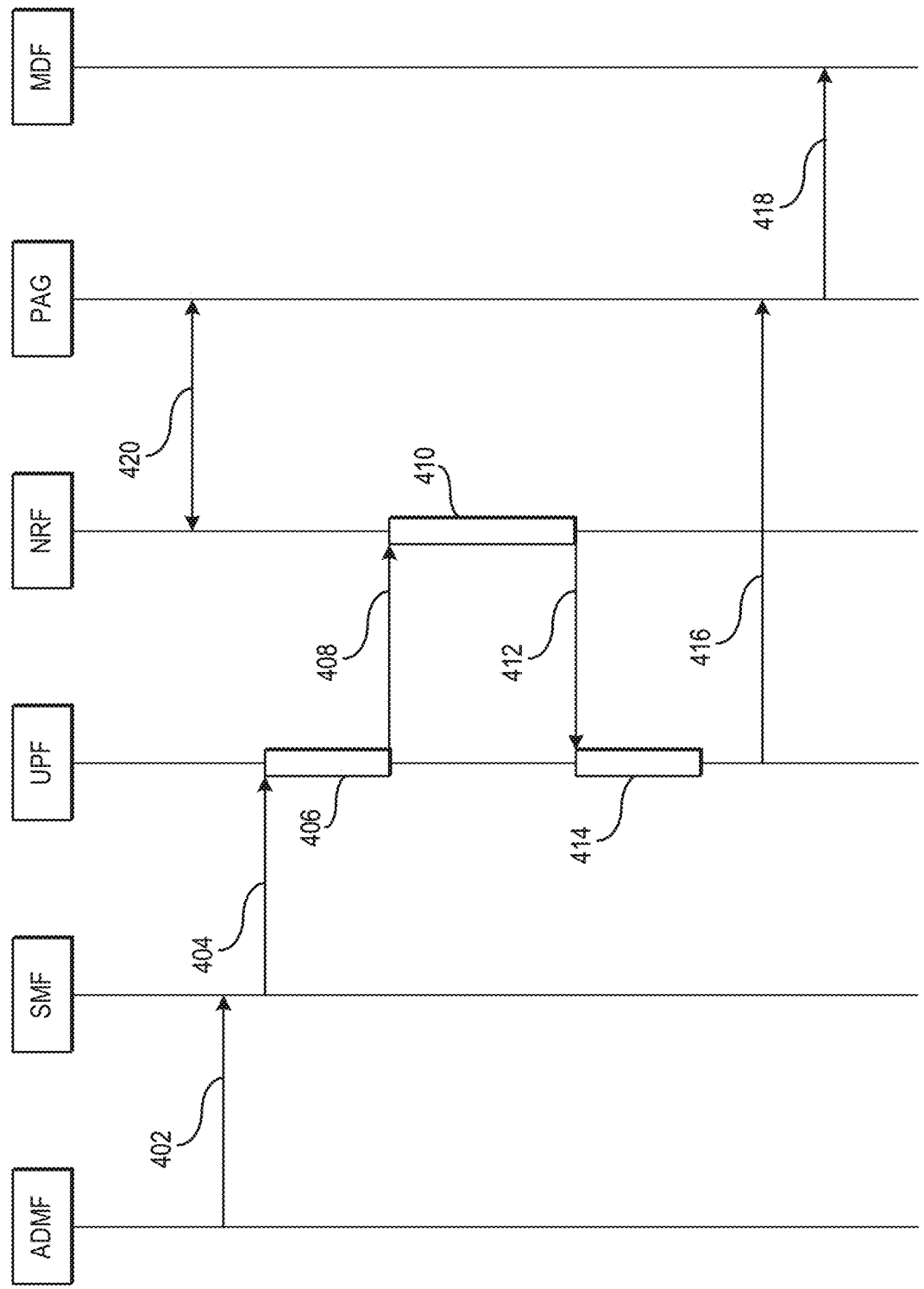
FIG. 4 is a call flow diagram illustrating a method for assigning an aggregation device to a data session device according to some of the example embodiments.

FIG. 4 is a call flow diagram illustrating a method for assigning a PAG to a UPF according to some of the example embodiments.

In step 402, method 400 can include receiving an intercept message from an ADMF. As illustrated, in method 400, an SMF can receive the intercept message. In some embodiments, the intercept message can be transmitted via an L1_X1 interface from the ADMF to the SMF as part of an LI request. In some embodiments, the intercept request can include a target (e.g., UE or subscriber) identifier, an MDF2 identifier or address, an MDF3 identifier or address, and a service type (e.g., voice, data, PTT, SMS/MMS, etc.). In some embodiments, the SMF can act as the triggering function (TF) in the LI system. As illustrated, in step 420 a PAG registration call flow can be periodically executed according to the embodiments of FIG. 3.

In step 404, method 400 can include receiving an LI request including triggering data from the SMF at a UPF. In some embodiments, method 400 can transmit triggering data over a LI_T3 interface. In some embodiments, the triggering data can include a target identifier, one or more interception rules, an MDF3 address or identifier, and correlation information. In some embodiments, the interception rules can comprise any rules that define when and how the UPF should intercept data to or from the target identifier. In some embodiments, the correlation information can comprise any information used to handle handover interface correlation.

In response to receiving triggering data, the UPF can (in step 406) invoke a PAG discovery process. In step 406, method 400 can include first extracting data describing the intercept. In an embodiment, data describing the intercept can include data regarding the UPF involved in the intercept or properties of the required intercept, as discussed further herein. Then, in step 408, method 400 can include transmitting this information as parameters in an NRF query.

In some embodiments, step 406 can include extracting an instance identifier of the UPF. In some embodiments, step 406 can include identifying one or more required capabilities of the necessary PAG (e.g., voice, SMS/MMS, data, PTT capabilities). In some embodiments, step 406 can include identifying a 5G slice identifier of the UPF. In some embodiments, step 406 can include determining the current load level of the UPF. In some embodiments, step 406 can comprise extracting the location of a UE, UPF, or user.

In step 408, method 400 can package the extracted data and query the NRF to determine a respective PAG function. In some embodiments, step 408 can comprise issuing an HTTP request to the NRF. In some embodiments, the HTTP request can include an HTTP GET request. For example, step 408 can include issuing a GET request to the URI: ../nnrf-disc/v./nf-instances?target-nf-type=CCPAG&requester-nf-type=UPF&<Query Parameters>, wherein <query parameters> comprises a URL-encoded version of the extracted data. As illustrated, the query can identify the requested return type ("CCPAG") and the requestor type ("UPF").

In step 410, method 400 can include an NRF identifying a suitable PAG based on the query parameters received in the request of step 408. As described in FIG. 3, the NRF can maintain a database of PAG functions and associated profile data. Based on the identity of the UPF and the query parameters, the NRF can identify the optimal PAG function for the requesting UPF. Various approaches can be used to identify the optimal PAG function. For example, the NRF can match location information of the UPF (identified based on the UPF identifier) to the nearest (geographically) PAG functions (e.g., PAG functions within the same data center or physically located near to the UPF in the data center). As another example, the NRF can preemptively filter all PAGs that do not include the required service type interception capabilities. As another example, the NRF can filter available PAGs having the same slice identifier as the UPF. As another example, the NRF can select PAGs having the lowest (real or perceived) latency or load level. As another example, the NRF can use hard-coded rules to match PAG functions to a UPF (e.g., certain UPFs or UPF types may be required to use certain PAG functions). As another example, the geographic location of the UPF can be used to identify a legal jurisdiction and the PAG function can be filtered to only identify those PAG functions that meet the legal requirements of the jurisdiction. Other types of filtering or selection can be implemented. Further, the NRF can employ multiple such examples to identify an appropriate PAG function.

In step 412, method 400 can include returning an identification of the optimal PAG function to the UPF. In some embodiments, step 412 can include returning an instance identifier to the UPF. Alternatively, or in conjunction with the foregoing, step 412 can include returning an address (e.g., IPv4, IPv6, FQDN) to the UPF.

In step 414, method 400 can include associating a point of interception (POI) function with the PAG function returned in step 412. In some embodiments, the UPF can implement a CC-POI or similar POI. In response to the PAG instance (or address), the UPF can configure the POI to forward intercepted data to the PAG function returned by the NRF.

In step 416, during operation, method 400 can include a UPF transmitting intercepted content to the PAG. In some embodiments, the message in step 416 can include the intercepted content, the target identifier, correlation information, and various other items of data. As discussed, the PAG may receive such messages from multiple POIs (and thus UPFs). In response, the PAG aggregates the data and transmits aggregated interception data to MDF for transmittal to a LEMF or similar entity in step 418. In an embodiment, steps 416 and 418 can be executed repeatedly while a warrant is valid.

As illustrated, in the foregoing method 400, a UPF is configured to query an NRF and obtain an optimal PAG function based on properties of the UPF and/or the type of service (e.g., enterprise, consumer, IoT, MEC, etc.). The UPF can then configure its POI to transmit data to the optimal PAG function. By providing a dynamic PAG selection process, the most optimal PAG function that meets the requirements of the LI request can be selected for each LI triggering message.

Figure 5:
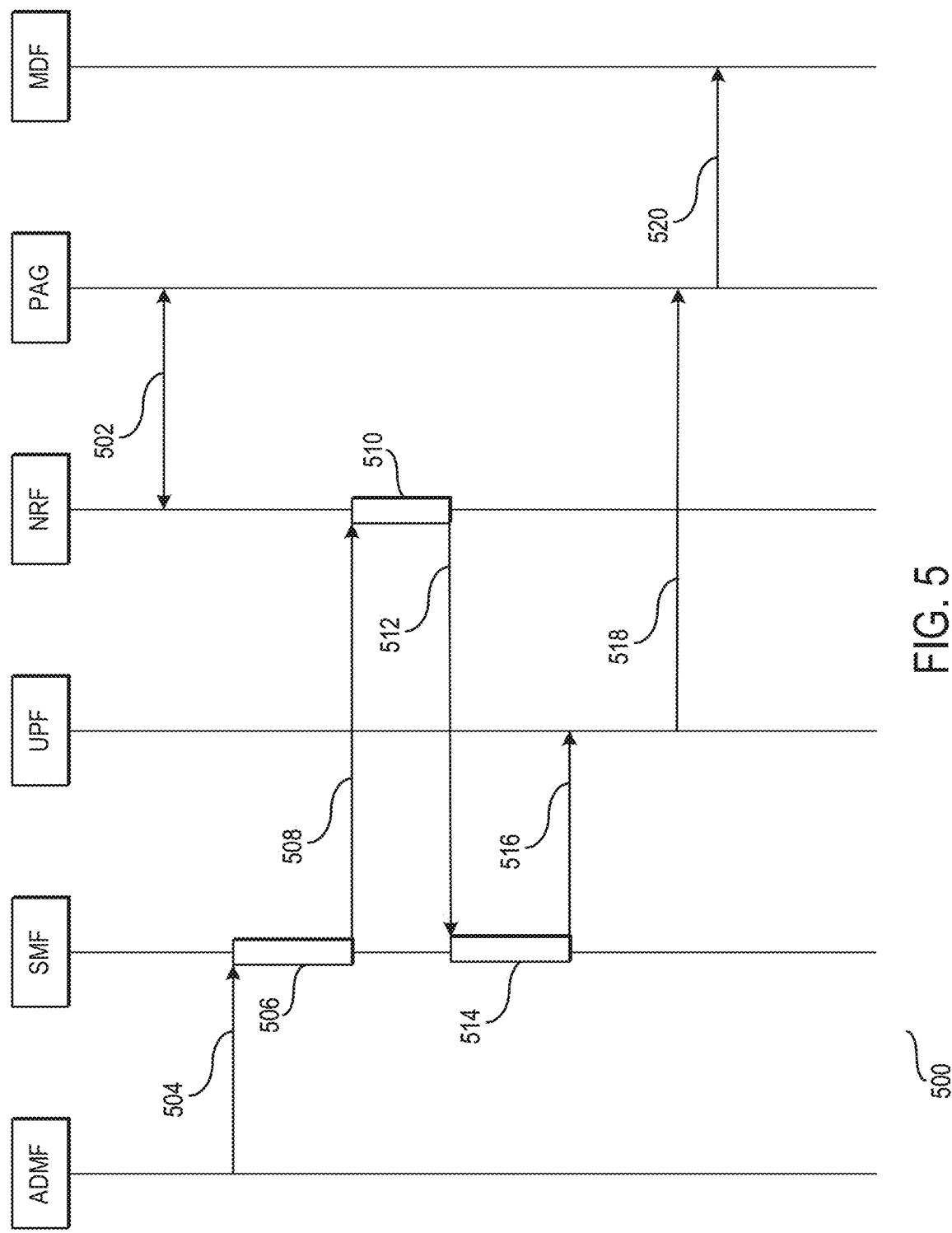
FIG. 5 is a call flow diagram illustrating a method for assigning an aggregation device to a data session device according to some of the example embodiments.

FIG. 5 is a call flow diagram illustrating a method for assigning a PAG to a UPF according to some of the example embodiments.

In step 504, method 500 can include receiving an intercept message from an ADMF. As illustrated, in method 500, an SMF can receive the intercept message. In some embodiments, the intercept message can be transmitted via an L1_X1 interface from the ADMF to the SMF as part of an LI request. In some embodiments, the intercept message can comprise a session initialization message. In some embodiments, the intercept request can include a target (e.g., UE or subscriber) identifier, an MDF2 identifier or address, an MDF3 identifier or address, and a service type (e.g., voice, data, PTT, SMS/MMS, etc.). In some embodiments, the SMF can act as the triggering function (TF) in the LI system. As illustrated, in step 502 a PAG registration call flow can be periodically executed according to the embodiments of FIG. 3.

In step 506, method 500 can include invoking a network discovery process for a target UPF. In an embodiment, an SMF can determine the UPF that will be used for establishing a data session for a given data session to be intercepted. In some embodiments, the UPF can be associated with a given UPF instance identifier. In some embodiments, step 506 can include extracting an instance identifier of the UPF. In some embodiments, step 506 can include identifying one or more required capabilities of the necessary PAG (e.g., voice, SMS/MMS, data, PTT capabilities). In some embodiments, step 506 can include identifying a 5G slice identifier of the UPF. In some embodiments, step 506 can include determining the current load level of the UPF.

In response, the SMF, in step 508, can issue a request to the NRF to obtain a PAG instance identifier for the determined UPF. In some embodiments, step 508 can comprise issuing an HTTP request to the NRF. In some embodiments, the HTTP request can include an HTTP GET request. For example, step 508 can include issuing a GET request to the URI: ../nnrf-disc/v./nf-instances?target-nf-type=CCPAG&requester-nf-type=SMF&routing-indicator={UPF ID}, where "{UPD IF}" comprises data describing the intercept, for example the instance identifier of the UPF. In some embodiments, the SMF can issue the request to the NRF to obtain a PAG instance identifier simultaneously with issuing a request for a UPF identifier. That is, in some embodiments, the SMF can reuse the request for a UPF identifier to also request a PAG instance identifier.

In step 510, method 500 can include an NRF identifying a suitable PAG based on the query parameters received in the request of step 508. As described in FIG. 3, the NRF can maintain a database of PAG functions and associated profile data. Based on the identity of the UPF and the query parameters, the NRF can identify the optimal PAG function for the requesting UPF. Various approaches can be used to identify the optimal PAG function. For example, the NRF can match location information of the UPF (identified based on the UPF identifier) to the nearest (geographically) PAG functions (e.g., PAG functions within the same data center or physically located near to the UPF in the data center). As another example, the NRF can preemptively filter all PAGs that do not include the required service type interception capabilities. As another example, the NRF can filter available PAGs having the same slice identifier as the UPF. As another example, the NRF can select PAGs having the lowest (real or perceived) latency or load level. As another example, the NRF can use hard-coded rules to match PAG functions to a UPF (e.g., certain UPFs or UPF types may be required to use certain PAG functions). As another example, the geographic location of the UPF can be used to identify a legal jurisdiction and the PAG function can be filtered to only identify those PAG functions that meet the legal requirements of the jurisdiction. Other types of filtering or selection can be implemented. Further, the NRF can employ multiple such examples to identify an appropriate PAG function.

In step 512, method 500 can include returning an identification of the optimal PAG function to the SMF. In some embodiments, step 512 can include returning an instance identifier to the SMF. Alternatively, or in conjunction with the foregoing, step 512 can include returning an address (e.g., IPv4, IPv6, FQDN) to the UPF.

In step 514, method 500 can include transmitting the identification of the respective PAG function to a UPF prior to the UPF establishing a data session. In some embodiments, step 514 can include replacing an MDF address included in the message in step 504 with the address (e.g., IP address) of the PAG function instance returned in step 512. As such, the SMF can dynamically adjust the output of a POI based on the data returned by the NRF, transparent to the UPF.

In step 516, method 500 can include transmitting triggering data over a LI_T3 interface, the triggering data including the PAG instance address returned in step 512. As discussed, in some embodiments, the PAG instance address is used as the X3 address in the triggering data transmitted over the LI_T3 interface. As discussed with respect to step 404, the triggering data can include additional data such as a target identifier, one or more interception rules, and correlation information. In response to the targeting data, the UPF can associate a POI function with the supplied PAG function. In some embodiments, the UPF can implement a CC-POI or similar POI. In response to the PAG instance (or address), the UPF can configure the POI to forward intercepted data to the PAG function returned by the NRF.

In step 518, during operation, method 500 can include a UPF transmitting intercepted content to the PAG. In some embodiments, the message in step 518 can include the intercepted content, the target identifier, correlation information, and various other items of data. As discussed, the PAG may receive such messages from multiple POIs (and thus UPFs). In response, the PAG aggregates the data and transmits aggregated interception data to MDF for transmittal to a LEMF or similar entity in step 520. In an embodiment, steps 518 and 520 can be executed repeatedly while a warrant is valid.

As illustrated, in the foregoing method 500, an SMF is configured to query an NRF and obtain an optimal PAG function based on the properties of the UPF. The SMF can then configure the UPF to transmit data to the optimal PAG function. By providing a dynamic PAG selection process, the fastest PAG function that meets the requirements of the LI request can be selected for each LI triggering message. Further, PAG selection can be more centralized in a smaller number of SMF instances which requires less overall computation.

In an embodiment, the ADMF can be configured to query the NRF directly for a PAG function corresponding to a POI. In this embodiment, step 508 can be called by the ADMF, and step 512 can be received by the ADMF prior to step 504. In this embodiment, the ADMF (or, in another embodiment, the LIPF) can query the NRF to obtain a list of PAGs and can determine a closest available PAG to a UPF in a specific geographic region based on policies described previously. In other embodiments, the NRF can be configured to push a list of PAGs to a given ADMF or LIPF. In this embodiment, during X1 provisioning between the ADMF and SMF, the LIPF can transmit a message (e.g., an ActivateTask message) to the SMF that includes various data describing intercept. For example, the message can include a task identifier (XID), target identifier, and delivery identifier (DID) (e.g., address to send intercepted information). In some embodiments, the DID can include the PAG address selected based on the list returned from the NRF. For example, using this approach, the DID can include an IP address or FQDN of the desired PAG. In some embodiments, if an FQDN is included, the SMF can be configured to perform a Domain Name Service (DNS) lookup to resolve the FQDN to an IP address. The SMF will then use the resolved IP address (or received IP address, as applicable) to instruct the UPF to deliver intercepted communications to the PAG.

Figure 6:
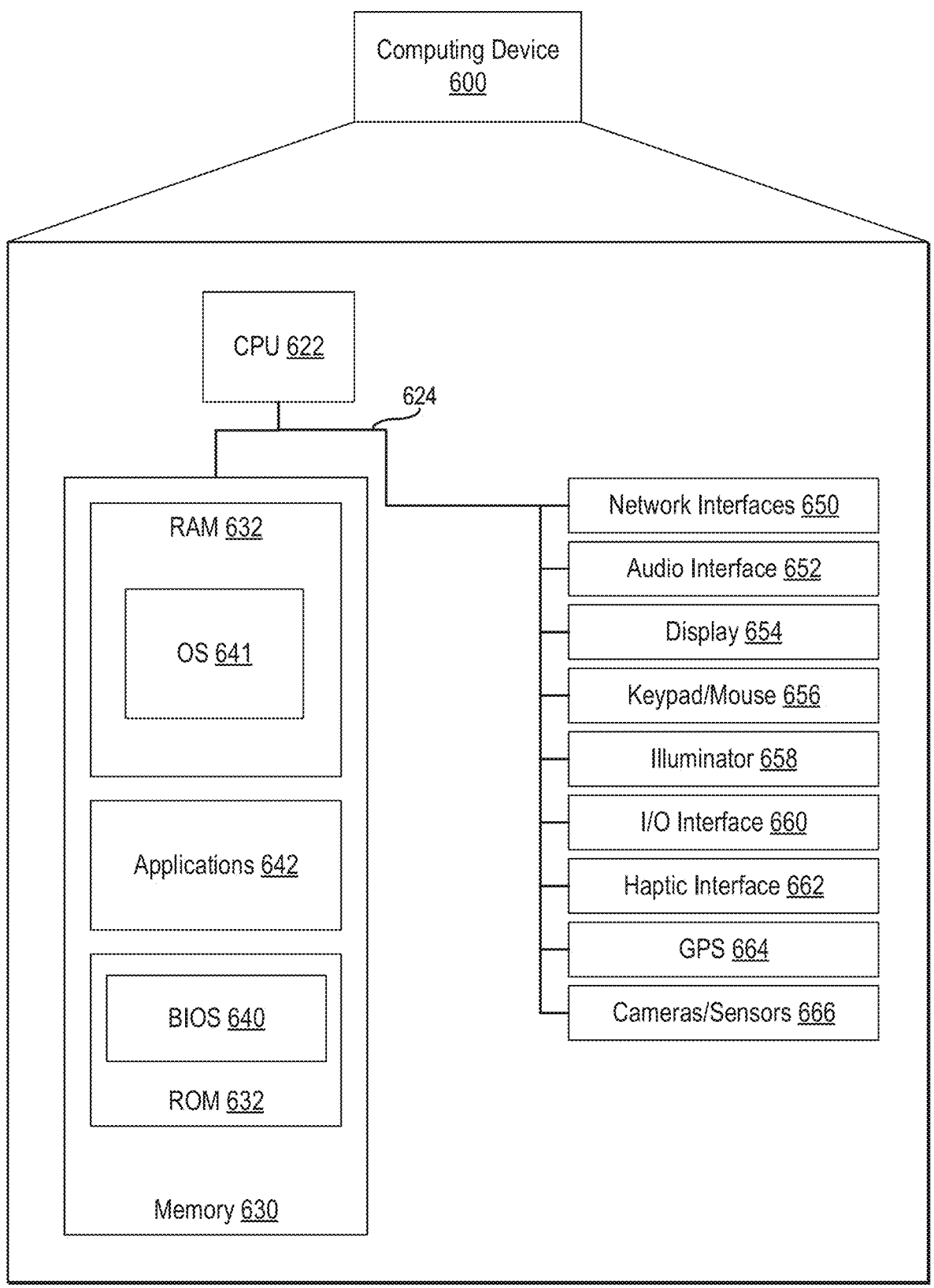
FIG. 6 is a block diagram illustrating a computing device showing an example of a client or server device used in the various embodiments of the disclosure.

FIG. 6 is a block diagram illustrating a computing device showing an example of a client or server device used in the various embodiments of the disclosure.

The computing device 600 may include more or fewer components than those shown in FIG. 6, depending on the deployment or usage of the computing device 600. For example, a server computing device, such as a rack-mounted server, may not include an audio interface 652, display 654, keypad/mouse 656, illuminator 658, haptic interface 662, Global Positioning System (GPS) receiver such as GPS receiver 664, or cameras/sensors 666. Some devices may include additional components not shown, such as graphics processing unit (GPU) devices, cryptographic co-processors, artificial intelligence (AI) accelerators and/or engines, or other peripheral devices.

As shown in the figure, the computing device 600 includes a central processing unit (CPU) 622 in communication with a mass memory 630 via a bus 624. The computing device 600 also includes a network interface 650, an audio interface 652, a display 654, a keypad/mouse 656, an illuminator 658, an input/output interface 660, a haptic interface 662, a GPS receiver 664, and a camera(s) or other optical, thermal, or electromagnetic cameras/sensors 666. The computing device 600 can include a plurality of cameras/sensors 666. The positioning of the cameras/sensors 666 on the computing device 600 can change per computing device 600 model, per computing device 600 capabilities, and the like, or some combination thereof.

In some embodiments, the CPU 622 may comprise a general-purpose CPU. The CPU 622 may comprise a single-core or multiple-core CPU. The CPU 622 may comprise a system-on-a-chip (SoC) or a similar embedded system. In some embodiments, a GPU may be used in place of, or in combination with, a CPU 622. Mass memory 630 may comprise a dynamic random-access memory (DRAM) device, a static random-access memory device (SRAM), or a Flash (e.g., NAND Flash) memory device. In some embodiments, mass memory 630 may comprise a combination of such memory types. In one embodiment, the bus 624 may comprise a Peripheral Component Interconnect Express (PCIe) bus. In some embodiments, bus 624 may comprise multiple busses instead of a single bus.

Mass memory 630 illustrates another example of computer storage media for the storage of information such as computer-readable instructions, data structures, program modules, or other data. Mass memory 630 stores a basic input/output system, BIOS 640, for controlling the low-level operation of the computing device 600. The mass memory also stores an operating system 641 for controlling the operation of the computing device 600

Applications 642 may include computer-executable instructions which, when executed by the computing device 600, perform any of the methods (or portions of the methods) described previously in the description of the preceding Figures. In some embodiments, the software or programs implementing the method embodiments can be read from a hard disk drive (not illustrated) and temporarily stored in RAM 632 by CPU 622. CPU 622 may then read the software or data from RAM 632, process them, and store them in RAM 632 again.

The computing device 600 may optionally communicate with a base station (not shown) or directly with another computing device. Network interface 650 is sometimes known as a transceiver, transceiving device, or network interface card (NIC).

The audio interface 652 produces and receives audio signals such as the sound of a human voice. For example, the audio interface 652 may be coupled to a speaker and microphone (not shown) to enable telecommunication with others or generate an audio acknowledgment for some action. Display 654 may be a liquid crystal display (LCD), gas plasma, light-emitting diode (LED), or any other type of display used with a computing device. Display 654 may also include a touch-sensitive screen arranged to receive input from an object such as a stylus or a digit from a human hand.

Keypad/mouse 656 may comprise any input device arranged to receive input from a user. Illuminator 658 may provide a status indication or provide light.

The computing device 600 also comprises an input/output interface 660 for communicating with external devices, using communication technologies, such as USB, infrared, Bluetooth™, or the like. The haptic interface 662 provides tactile feedback to a user of the client device.

The GPS receiver 664 can determine the physical coordinates of the computing device 600 on the surface of the Earth, which typically outputs a location as latitude and longitude values. GPS receiver 664 can also employ other geo-positioning mechanisms, including, but not limited to, triangulation, assisted GPS (AGPS), E-OTD, CI, SAI, ETA, BSS, or the like, to further determine the physical location of the computing device 600 on the surface of the Earth. In one embodiment, however, the computing device 600 may communicate through other components, provide other information that may be employed to determine the physical location of the device, including, for example, a MAC address, IP address, or the like.

The present disclosure has been described with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, the reasonably broad scope for claimed or covered subject matter is intended. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in some embodiments" as used herein does not necessarily refer to the same embodiment, and the phrase "in another embodiment" as used herein does not necessarily refer to a different embodiment. It is intended, for example, that claimed subject matter includes combinations of example embodiments in whole or in part.

In general, terminology may be understood at least in part from usage in context. For example, terms such as "and," "or," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure has been described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur in different orders than illustrated. For example, two blocks shown in succession can, in fact, be executed substantially concurrently, or the blocks can sometimes be executed in the reverse order, depending upon the functionality/acts involved.

For the purposes of this disclosure, a non-transitory computer-readable medium (or computer-readable storage medium/media) stores computer data, which data can include computer program code (or computer-executable instructions) that is executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, cloud storage, magnetic cassettes, magnetic tape, magnetic disk storage, or other magnetic storage devices, or any other physical or material medium which can be used to tangibly store the desired information or data or instructions and which can be accessed by a computer or processor.

In the preceding specification, various example embodiments have been described with reference to the accompanying drawings. However, it will be evident that various modifications and changes may be made thereto, and additional embodiments may be implemented without departing from the broader scope of the disclosed embodiments as set forth in the claims that follow. The specification and drawings are accordingly to be regarded in an illustrative rather than restrictive sense.

We claim:

1. A method comprising:
   maintaining a list of point of interception aggregation (PAG) functions in a network function repository function (NRF) of a cellular network upon instantiation of the PAG functions;
   receiving a lawful intercept request for a target user equipment (UE);
   identifying a user plane function (UPF) handling data traffic for the target UE;
   querying the NRF to determine a respective PAG function based on one or more properties of the UPF and the lawful intercept request; and
   associating a point of interception (POI) function with the respective PAG function.

2. The method of claim 1, wherein maintaining a list of PAG functions comprises:
   detecting an instantiation of a given PAG function; and
   transmitting a notification to the NRF in response to the instantiation.

3. The method of claim 2, wherein transmitting the notification to the NRF comprises transmitting a profile describing the given PAG function, the profile including one or more of a geographic location, one or more associated user plane function (UPF) identifiers, one or more PAG capabilities, one or more UPF location identifiers, a service type, an Internet Protocol (IP) address, one or more slice identifiers, or a traffic load type.

4. The method of claim 1, wherein querying the NRF to determine the respective PAG function comprises issuing, by a user plane function (UPF), a query to the NRF in response to a lawful intercept (LI) message.

5. The method of claim 4, wherein the UPF receives an identification of the respective PAG function from the NRF in response to the query, and the UPF transmits intercepted data to the respective PAG function.

6. The method of claim 1, wherein querying the NRF to determine the respective PAG function comprises issuing, by a session management function (SMF), a query to the NRF in response to a session initialization message.

7. The method of claim 6, wherein the SMF receives an identification of the respective PAG function from the NRF in response to the query and transmits the identification of the respective PAG function to a UPF prior to the UPF establishing a data session.

8. The method of claim 1, wherein querying the NRF to determine the respective PAG function comprises issuing, by an administrative function (ADMF), a query to the NRF prior to establishing an intercept.

9. The method of claim 1, wherein querying the NRF to determine a respective PAG function based on a location of a UPF.

10. A non-transitory computer-readable storage medium for tangibly storing computer program instructions capable of being executed by a computer processor, the computer program instructions defining steps of:
maintaining a list of point of interception aggregation (PAG) functions in a network function repository function (NRF) of a cellular network upon instantiation of the PAG functions;
receiving a lawful intercept request for a target user equipment (UE);
identifying a user plane function (UPF) handling data traffic for the target UE;
querying the NRF to determine a respective PAG function; and
associating a point of interception (POI) function with the respective PAG function.

11. The non-transitory computer-readable storage medium of claim 10, wherein maintaining a list of PAG functions comprises:
detecting an instantiation of a given PAG function; and
transmitting a notification to the NRF in response to the instantiation, the notification including a profile describing the given PAG function, the profile including one or more of a geographic location, one or more associated user plane function (UPF) identifiers, one or more PAG capabilities, one or more UPF location identifiers, a service type, an Internet Protocol (IP) address, one or more slice identifiers, or a traffic load type.

12. The non-transitory computer-readable storage medium of claim 10, wherein querying the NRF to determine the respective PAG function comprises issuing, by a user plane function (UPF), a query to the NRF in response to a lawful intercept (LI) message.

13. The non-transitory computer-readable storage medium of claim 12, wherein the UPF receives an identification of the respective PAG function from the NRF in response to the query, and the UPF transmits intercepted data to the respective PAG function.

14. The non-transitory computer-readable storage medium of claim 10, wherein querying the NRF to determine the respective PAG function comprises issuing, by a session management function (SMF), a query to the NRF in response to a session initialization message.

15. The non-transitory computer-readable storage medium of claim 14, wherein the SMF receives an identification of the respective PAG function from the NRF in response to the query and transmits the identification of the respective PAG function to a UPF prior to the UPF establishing a data session.

16. A device comprising:
a processor configured to:
receive a lawful intercept request for a target user equipment (UE);
identify a user plane function (UPF) handling data traffic for the target UE;
query a network function repository function (NRF) of a cellular network to determine a respective PAG function based on one or more properties of the UPF and the lawful intercept request, the NRF configured to maintain a list of point of interception aggregation (PAG) functions in the cellular network upon instantiation of the PAG functions; and
associate a point of interception (POI) function with the respective PAG function.

17. The device of claim 16, wherein querying the NRF to determine the respective PAG function comprises issuing a query to the NRF in response to receiving a message from an SMF.

18. The device of claim 17, the processor further configured to receive an identification of the respective PAG function from the NRF in response to the query and transmit intercepted data to the respective PAG function.

19. The device of claim 16, wherein querying the NRF to determine the respective PAG function comprises issuing a query to the NRF in response to receiving a message from an ADMF.

20. The device of claim 19, the processor further configured to receive an identification of the respective PAG function from the NRF in response to the query and transmit the identification of the respective PAG function to a UPF prior to the UPF establishing a data session.

* * * * *